United States Patent
Sorge et al.

(10) Patent No.: US 7,681,116 B2
(45) Date of Patent: *Mar. 16, 2010

(54) AUTOMATIC REPUBLICATION OF DATA

(75) Inventors: Terri Sorge, Seattle, WA (US); Robert McCaughey, Bellevue, WA (US); Matthew Gauthier, Redmond, WA (US); Carol Lining Liu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1054 days.

This patent is subject to a terminal disclaimer.

(21) Appl. No.: 11/363,733

(22) Filed: Feb. 27, 2006

(65) Prior Publication Data

US 2006/0149789 A1 Jul. 6, 2006

Related U.S. Application Data

(63) Continuation of application No. 09/595,736, filed on Jun. 16, 2000, now Pat. No. 7,032,173.

(51) Int. Cl.
*G06F 17/00* (2006.01)
*G06F 17/20* (2006.01)
*G06F 17/21* (2006.01)
*G06F 17/24* (2006.01)
*G06F 17/25* (2006.01)
*G06F 17/26* (2006.01)
*G06F 17/27* (2006.01)
*G06F 17/28* (2006.01)

(52) U.S. Cl. .................................................. 715/209

(58) Field of Classification Search ............... 715/209; 707/201, E17.006
See application file for complete search history.

(56) References Cited

U.S. PATENT DOCUMENTS 5,623,591 A * 4/1997 Cseri ......................... 715/762

(Continued)

FOREIGN PATENT DOCUMENTS

WO   WO 9959086 A1 * 11/1999

OTHER PUBLICATIONS

Novell-Press Release, "Novell Anounces GroupWise Support for Intranet Document Management Standard", [http://www.novell.com/news/press/archive/1997/05/pr97077.html], published May 5, 1997.*

(Continued)

*Primary Examiner*—Stephen S Hong
*Assistant Examiner*—Nicholas R Hasty
(74) *Attorney, Agent, or Firm*—Merchant & Gould PC

(57) ABSTRACT

Automatically republishing native data from a native data file into a published file. In response to initially publishing the native data into the published file, a publish object is created that corresponds to the published data and the native data. The publish object is associated with the native data file and indicates whether the native data is to be automatically republished upon resaving of the native data file. The publish object further indicates the location of the published file, a reference to the location of the native data within the native data file, and an alert string. The publish object is identified by a unique identifier that is also stored in the published file to indicate the location of the published data. In response to resaving the native data, the publish object is examined to determine whether the native data is to be automatically republished.

15 Claims, 4 Drawing Sheets

U.S. PATENT DOCUMENTS

| | | | |
|---|---|---|---|
| 5,669,005 A | 9/1997 | Curbow et al. | 715/523 |
| 5,809,317 A | 9/1998 | Kogan et al. | 715/501.1 |
| 5,848,415 A | 12/1998 | Guck | 707/10 |
| 5,857,211 A * | 1/1999 | Carper et al. | 715/236 |
| 5,870,605 A | 2/1999 | Bracho et al. | 719/318 |
| 5,911,776 A | 6/1999 | Guck | 709/217 |
| 5,940,834 A | 8/1999 | Pinard et al. | 707/102 |
| 5,956,736 A | 9/1999 | Hanson et al. | 715/513 |
| 6,094,649 A | 7/2000 | Bowen et al. | 707/3 |
| 6,157,934 A | 12/2000 | Khan et al. | 715/503 |
| 6,323,879 B1 * | 11/2001 | Sauerbrei | 345/672 |
| 6,327,584 B1 | 12/2001 | Xian et al. | 707/1 |
| 6,425,006 B1 | 7/2002 | Chari et al. | 709/224 |
| 6,549,918 B1 | 4/2003 | Probert et al. | 707/203 |
| 6,565,609 B1 | 5/2003 | Sorge et al. | 715/503 |
| 6,613,098 B1 | 9/2003 | Sorge et al. | 715/503 |
| 6,618,751 B1 | 9/2003 | Challenger et al. | 709/213 |
| 6,636,886 B1 | 10/2003 | Katiyar et al. | 709/203 |
| 6,745,224 B1 * | 6/2004 | D'Souza et al. | 709/202 |
| 6,823,522 B1 | 11/2004 | Lamb | 719/316 |

OTHER PUBLICATIONS

Novell—Press Release (hereafter referred to as Novell), "Novell Announces GroupWise Support for Intranet Document Management Standard", [http://www.novell.com/news/press/archive/1997/05/pr97077.html], published May 5, 1997.

Novell—Press Release, "Novell Showcases Jefferson Project on WebTV", [http://novell.com/news.press/archive.1997/02/pr97016.html], published Feb. 11, 1997.

Novell, "The Jefferson Project", [http://developer.novell.com/research/appnotes/1997/july/04/04.html], published Jul. 1997.

* cited by examiner

AUTOMATIC REPUBLICATION OF DATA

CROSS-REFERENCE TO RELATED APPLICATIONS

This application is a continuation of U.S. patent application Ser. No. 09/595,736, entitled "Automatic Republication of Data," filed Jun. 16, 2000, which is hereby incorporated herein by reference in its entirety.

FIELD OF THE INVENTION

The present invention generally relates to exporting data into published files. More particularly, the present invention relates to automatically updating previously exported data in a published file, upon modification of another file.

BACKGROUND OF THE INVENTION

A networked computer environment typically includes a server computer system that provides client computer systems with access to information and services. The server and client computer systems are usually connected via a local area or a wide area private Intranet system, or via the public Internet. Shared files are typically stored in an HTML file format, which has become an internationally accepted format for sharing data in a networked computer environment. A unique uniform resource locator (URL) may be associated with each HTML file, enabling client computer systems to request a specific HTML file from a server computer system.

Generally, an HTML file includes a hierarchical set of markup elements. Most markup elements include a start tag, followed by content, followed by an end tag. The content is typically a combination of text and nested markup elements. Tags, which are enclosed in angle brackets ('<' and '>'), indicate the file structure and the format of the file data. There are tags for markup elements such as titles and headers, for text attributes such as bold and italic, for lists, for paragraph boundaries, for links to other documents or other parts of the same document, for graphic images, for non-displayed comments, and for many other features. Further details regarding HTML may be found in reference books such as, "HTML For Dummies," by Ed Tittel and Steve James (1996).

An application program module used for viewing HTML files is commonly referred to as a browser. The primary function of a browser is to find, retrieve, and display HTML files and other files. A browser is generally not intended for word processing or data creation and manipulation. However, a browser may be used to display documents or data that are generated by other application program modules, once such documents or data are converted into an HTML or HTML-compatible format.

While application programs exist for directly creating and manipulating HTML data, users often prefer to create and manipulate data using more familiar applications programs, such as word processors, electronic spreadsheets and the like. An electronic spreadsheet, word processor, or other similar application program typically operates on "native data" stored in native data files having a format that is native to the particular application program. Many such application programs provide the user with the option to convert native data into HTML data and to publish the HTML data into an HTML file. However, data persistence is generally problematic when a user works with multiple files. In order to maintain consistency, the user must modify the HTML data in the HTML file upon every subsequent modification of the corresponding native data within the native data file.

The EXCEL 2000™ electronic spreadsheet application program, which is distributed by Microsoft Corporation or Redmond, Wash., includes functionality for publishing native data from a spreadsheet file into an HTML file, without requiring a separate HTML editor to define any HTML tags. During the publication process, EXCEL 2000 inserts a unique identifier into the destination HTML file in order to identify the published data and mark its location in the HTML file. EXCEL 2000 further stores the unique identifier in a data structure that is associated with the native spreadsheet file. Thus, by generating a series of user interface commands, the user is able to instruct EXCEL 2000 to locate the previously published data in the HTML file, by way of the unique identifier, and to update or "republish" the data in order to reflect changes made to the native data in the spreadsheet file.

As mentioned with respect to EXCEL 2000, the existing prior art application programs that address issue of publishing data into an HTML document require the user to generate a series of user interface commands in order to republish the data. If the user does not generate the proper user interface commands, or if the user does not remember to invoke the republication process after the native data is modified, the originally published data will be inconsistent with the modified native data. As is well known in the art, serious consequences may result from the sharing of inconsistent or outdated data in a networked computer environment. Therefore, there is a need for automatic republication of data into an HTML file or another published file, without the need for user interaction, in response to modification of corresponding native data.

SUMMARY OF THE INVENTION

The present invention meets the above-described needs by providing a method and system for automatically republishing native data from a native data file associated with an application program into a published file, such as an HTML file, an XML file, or another published file. In response to initially publishing the native data in to the published file, a publish object is created that corresponds to the published data and the native data. The publish object is associated with the native data file and may be stored within the native data file format. The publish object is a data structure that includes various properties. For example, the publish object indicates whether the native data is to be automatically republished upon resaving of the native data file. The publish object further indicates the location of the HTML file and a reference to the location of the native data within the native data file. In addition, the publish object may identify an alert string associated with the native data. The alert string may comprise an alert that is to be displayed when the native data is republished. Although a number of possible errors or warnings may occur during republication, it may be desirable to prioritize all of the possible errors and warnings and to display a single alert that identifies only the most critical error or warning. Thus, the alert string of the publish object may be determined by identifying a plurality of error and/or warning alerts that should be displayed when the native data is republished, determining which of the plurality of alerts is most critical, and storing the most critical alert as the alert string.

Subsequent to initially publishing the native data and creating the publish object, a determination may be made that the native data file has been resaved. In response to determining that the native data has been resaved, the publish object is examined to determine whether the native data is to be automatically republished. If the native data is to be automatically republished, the published file is retrieved and the native data is republished into the published file. The location of the published file may be determined by way of the publish object.

The previously published data in the published file is located by way of a unique identifier that identifies the published data as well as the publish object. Republishing the native data into the published file generally comprises translating the native data into the published file format, locating the previously published data within the published file by way of the unique identifier and replacing the previously published data with the translated native data. More particularly, republishing native data into an HTML file may comprise locating the previously published data within the HTML file by way of the unique identifier, deleting the previously published data, locating the native data within the native data file by way of the publish object, translating the native data into an HTML format, and replacing the previously published data with the translated native data.

The publish object may be stored in a publish object list associated with the native data file. The publish object list may include additional publish objects. In response to determining that the native data file has been resaved, the publish object list may be scanned for publish objects that indicate that selected native data is to be automatically republished. For each publish object that indicates that selected native data is to be automatically republished, the corresponding selected native data is republished. When no other publish objects are found that indicate that selected native data is to be automatically republished, the republication process of the present invention ends.

BRIEF DESCRIPTION OF THE DRAWING FIGURES

DETAILED DESCRIPTION OF EXEMPLARY EMBODIMENTS

Figure 1:
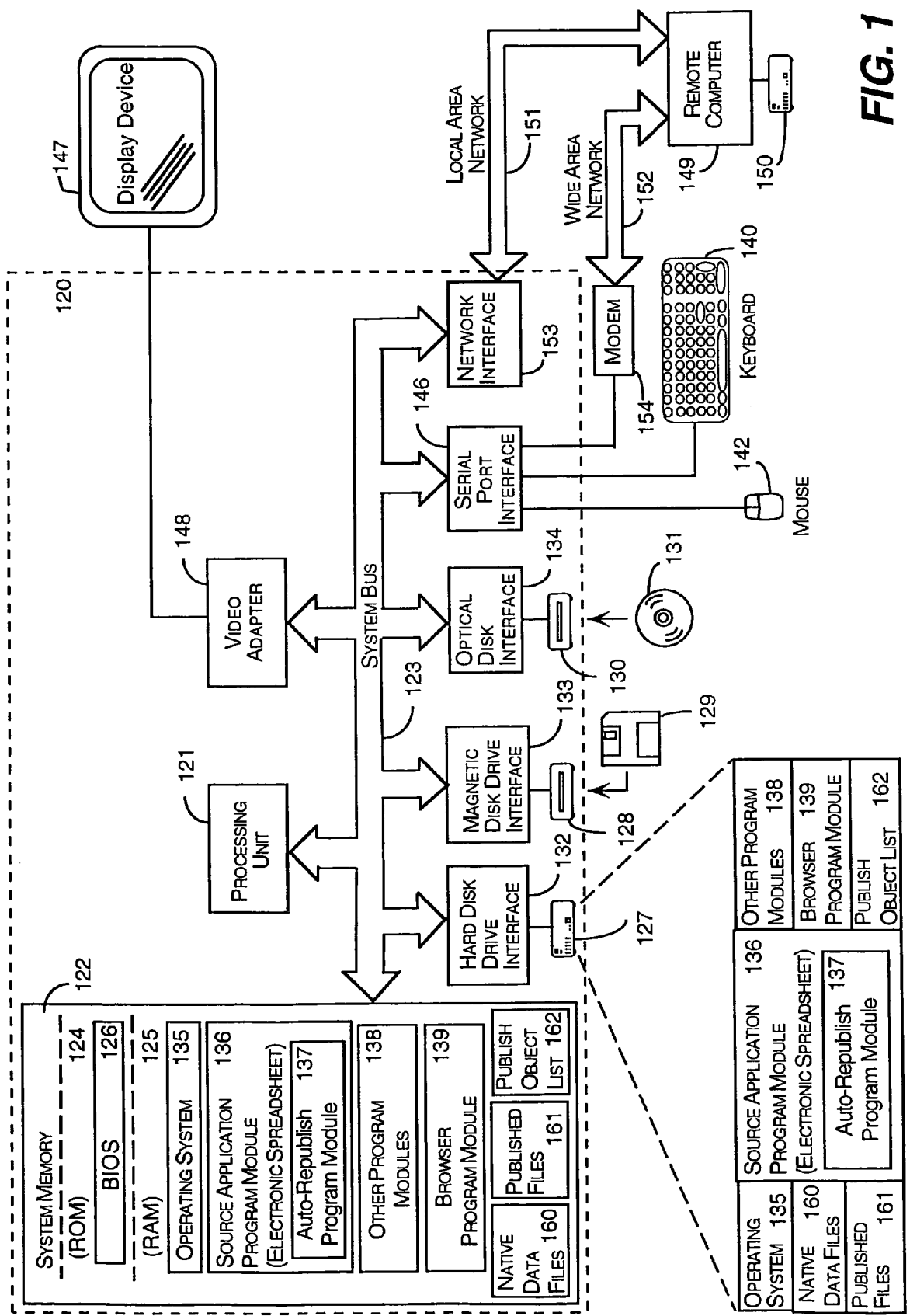
FIG. 1 is a block diagram illustrating an exemplary operating environment for implementation of the present invention.

The present invention provides a system and method for automatically republishing data into a published file, such as an HTML file, an XML file, or any other shared file. According to the present invention, data may be created and modified in a format that is native to a particular source application program, such as an electronic spreadsheet. The data having the format native to the source application program may then be published into published file. Data having a form at native to a source application program is referred to herein as "native data." Similarly, data that has been published into an published file is referred to herein as "published data." The term "data" is generally used herein to mean any information produced by a source application program, such as tables, charts, text, symbols, or images. The term "publish" and variations thereof are used herein to refer to the process of translating native data into a published data file format, if necessary, and inserting the translated data into an published file. The term "republish" is used herein to refer to the process of updating data that was previously published into a published file in order to include any modifications that may have been made to the native data.

Exemplary embodiments of the present invention will hereinafter be described with respect to an electronic spreadsheet application program. However, it is not intended that the invention be limited to electronic spreadsheet applications, since it may be clearly applied to other types of data native and to other types of application programs. In addition, while the intended use of the invention is to maintain data consistency between native (non-published) data and published data, it is contemplated that the broad principles of the invention may be applied to systems for maintain data consistency between any two or more data files According to one aspect of the present invention, a data structure is maintained to identify all native data in a native file that corresponds to published data in a published file. The data structure is referred to herein as a "publish objects list." Each "publish object" in the publish objects list corresponds to one or more native data elements that have been published into a published file. For example, a publish object may correspond to one or more cells, i.e., a range of cells, a table, a chart, etc., which exist in an electronic spreadsheet file and which have also been published into a published file. Each publish object comprises a list of various properties, such as a unique identifier; a reference to the native data in the first file; the address of the published file(s) that store the published data; the title(s) of such published file(s); an indication of whether the published data includes interactive controls; a flag indicating whether the native data is to be automatically republished; and an alert string. The aspects of these properties that are relevant to the present invention will be discussed in greater detail below.

In accordance with another aspect of the present invention, when a "save" command is invoked during execution of the source application program (electronic spreadsheet), a sub-routine is called that scans the publish object list to determine which, if any, publish objects are flagged for automatic republishing. If a publish object is flagged for automatic republishing, the sub-routine identifies the corresponding native data, retrieves the published file storing the published data and republishes the modified native data therein. After republication is complete, the published file is re-saved to its original location.

During a standard publication process (i.e., not an automatic republication process), various alerts may be displayed to the user. An alert may be in the form of a warning message, indicating that the publication operation will be successful but that certain data or formatting will be lost or modified. When an warning message is displayed, the user may be provided with the option to abort the publication process. An alert may also be in the form of an error message, indicating that the publication process cannot be completed. Depending on the nature of the native data to be published, it is possible that a standard publication process may cause many alerts to be generated.

As mentioned, the present invention automatically republishes data when the "save" command is invoked during execution of the source application program. The process of saving a document tends to be a sensitive operation from the user's point of view. A user is likely to doubt that the integrity of the native data has been maintained if he or she is bombarded with multiple alerts during a save operation. Furthermore, the user may become annoyed if he or she is required to continually input commands to ignore warning messages and proceed with the republication and save operations.

Therefore, another aspect of the present invention is aimed at reducing the negative impact that multiple alerts may have on a user's confidence in the save operation. In one embodiment, the user is presented with a single alert list, rather than multiple alerts. The single alert list includes only one alert (error message or warning message) per publish object. Accordingly, the present invention may include intelligence for determining which alert out of a plurality of possible alerts is to be displayed for a particular publish object. Such a determination may be based, for example, on a ranking of the alerts from the "most-fatal" to the "least fatal."

With reference to FIG. 1, an exemplary operating environment for implementation of the present invention includes a general purpose computing device in the form of a conventional personal computer 120. Generally, a personal computer 120 includes a processing unit 121, a system memory 122, and a system bus 123 that couples various system components including the system memory 122 to processing unit 121. System bus 123 may be any of several types of bus structures including a memory bus or memory controller, a peripheral bus, and a local bus using any of a variety of bus architectures. The system memory includes a read only memory (ROM) 124 and random access memory (RAM) 125. A basic input/output system (BIOS) 126, containing the basic routines that helps to transfer information between elements within personal computer 120, such as during start-up, is stored in ROM 124.

Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively. Although the exemplary environment described herein employs hard disk 127, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 120. For example, one or more native data files 160, one or more published files 161, and a "publish object list" data structure 162 may be stored in the RAM 125 and/or hard drive 127 of the personal computer 120.

A number of program modules may be stored on hard disk 127, magnetic disk 129, optical disk 131, ROM 124, or RAM 125, including an operating system 135, one or more source application program modules 136, and other program modules 138. Program modules include routines, sub-routines, programs, objects, components, data structures, etc., which perform particular tasks or implement particular abstract data types. Aspects of the present invention may be implemented in the form of an "auto-republish" program module 137 that is incorporated into or otherwise in communication with a source application program module 136, such as an electronic spreadsheet. The source application program module 136 comprises computer-executable instructions for publishing native data into a published file 161 and for creating a "publish object" data structure corresponding to the native data and the published data. The auto-republish program module 137 generally comprises computer-executable instructions for determining whether any publish objects stored or referenced in a publish object list 162 are flagged for automatic republication; for any publish object that is flagged for republication, determining whether the corresponding native data in the native data file 160 has been modified since it was last published; and republishing any such modified native data into the appropriate destination published file 161.

A user may enter commands and information into personal computer 120 through input devices, such as a keyboard 140 and a pointing device 142. Other input devices (not shown) may include a microphone, joystick, game pad, satellite dish, scanner, or the like. These and other input devices are often connected to processing unit 122 through a serial port interface 146 that is coupled to the system bus 123, but may be connected by other interfaces, such as a parallel port, game port, a universal serial bus (USB), or the like. A display device 147 may also be connected to system bus 123 via an interface, such as a video adapter 148. In addition to the monitor, personal computers typically include other peripheral output devices (not shown), such as speakers and printers.

Personal computer 120 may operate in a networked environment using logical connections to one or more remote computers 149. Remote computer 149 may be another personal computer, a server, a client, a router, a network PC, a peer device, or other common network node. While a remote computer 149 typically includes many or all of the elements described above relative to personal computer 120, only a memory storage device 150 has been illustrated in the figure. The logical connections depicted in the figure include a local area network (LAN) 151 and a wide area network (WAN) 152. Such networking environments are commonplace in offices, enterprise-wide computer networks, intranets, and the Internet.

When used in a LAN networking environment, personal computer 120 is connected to local area network 151 through a network interface or adapter 153. When used in a WAN networking environment, personal computer 120 typically includes a modem 154 or other means for establishing communications over WAN 152, such as the Internet. Modem 154, which may be internal or external, is connected to system bus 123 via serial port interface 146. In a networked environment, program modules depicted relative to personal computer 120, or portions thereof, may be stored in the remote memory storage device 150. It will be appreciated that the network connections shown are exemplary and other means of establishing a communications link between the computers may be used.

Moreover, those skilled in the art will appreciate that the present invention may be implemented in other computer system configurations, including hand-held devices, multi-processor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
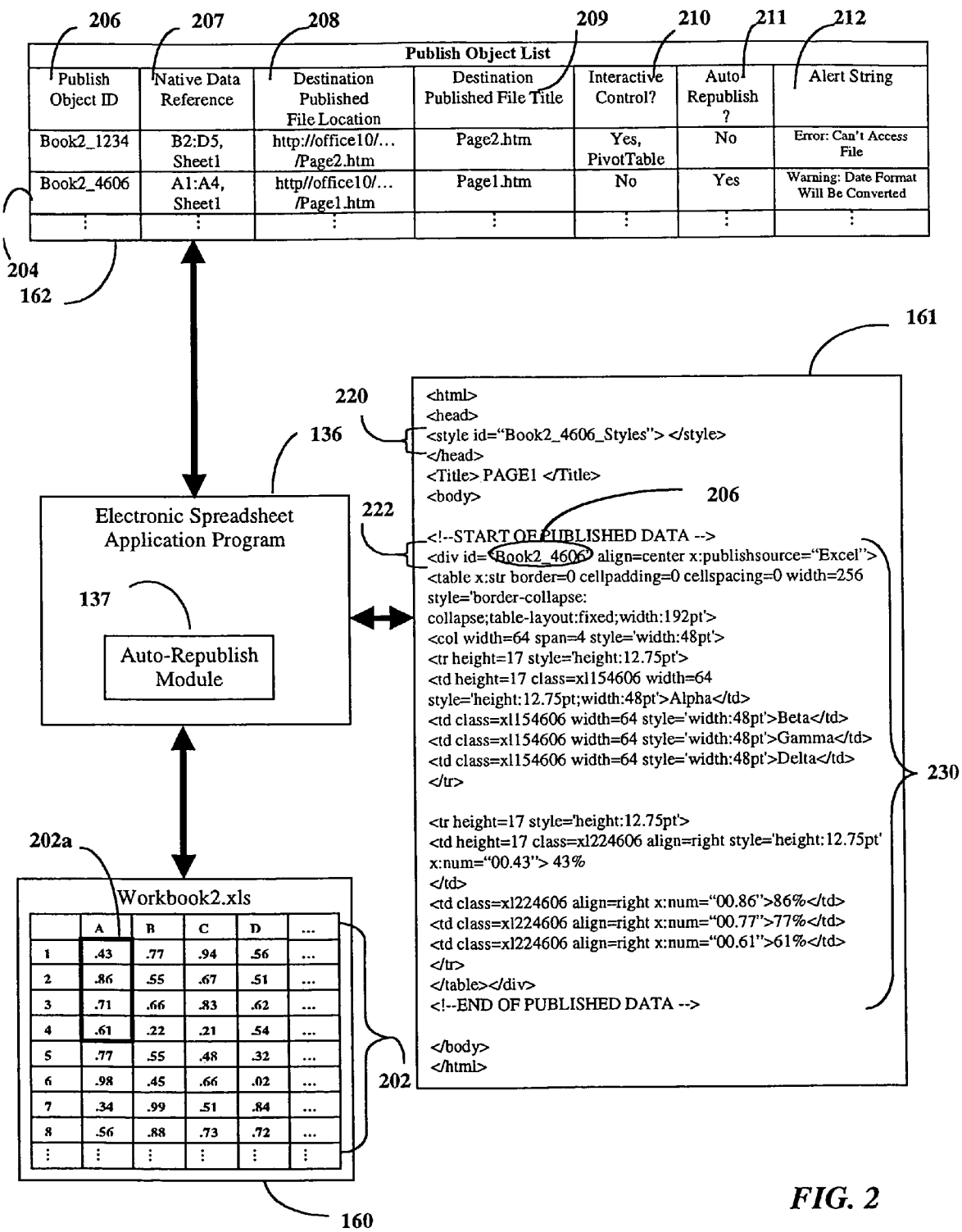
FIG. 2 is an abstract representation of an exemplary embodiment of the present invention.

The conceptual diagram of FIG. 2 provides a general overview of the present invention. As previously mentioned, an exemplary embodiment of the present invention may be implemented in a source application program module 136, such as an electronic spreadsheet. A source application program module (electronic spreadsheet) 136 provides for the creation and manipulation of native data 202 that is stored in a native data file 160 (shown as a spreadsheet document). During execution of the source application program 136, one or more native data elements may be selected by the user for publication into a published file 161. Each time a set of native data elements is published, a publish object 204 corresponding thereto is created and stored in a publish object list 162.

As shown, a publish object 204 created during the publication process is used to record various properties of the selected native data 202a and the corresponding published data 230. For example, the publish object 204 includes a "native data reference" 207 to the location of the selected native data 202a in the native data file 160. The native data reference 207 is a pointer that allows the selected native data 202a to be quickly located in the native data file 160. The publish object 204 also includes a "destination file reference" 208 to the address of the destination published file 161 and a "destination file title" 209 of the destination published file 161. The destination file reference 208 may point to a local or remote memory location. The publish object 204 may also include an "interactive control flag" 210, indicating whether the published data 230 was published with interactive controls, and the type of interactivity, if any. By way of example, Excel 2000 provides interactivity in the form of PivotTables, and PivotCharts, etc. As an important feature of the present invention, the publish object 204 further includes an "auto-republish flag" 211, indicating whether the selected native data 202a is to be automatically republished into the published file 161 upon modification of the selected native data 202a in the native data file 160. This auto-republish flag 211 may be set in response to a user input command received during the initial publication process or during any subsequent republication process.

One embodiment of the present invention provides functionality for disabling the auto-republishing feature. This functionality is provided in the form of a registry key that may be set to indicate that auto-republishing is to be disabled. If such a registry key is detected, the auto-republish flags 211 for any existing publish objects 204 are set to indicate that no auto-republication is to occur and the ability to set the auto-republish flag 211 on new publish objects 204 is disabled.

One embodiment of the invention provides a security mechanism for guarding against the inadvertent republication of sensitive data. Such a scenario may arise when a template is created having data ranges that are set up for auto-republication. An unsuspecting user may subsequently add private information to the template, thinking that the data will be only be saved to their local machine, when in fact it will also be republished to a shared location. Thus, the present invention may be configured to display a message during the first auto-republish operation of a given session (i.e. the time a native file is opened until the time it is closed). This message alerts the user that the native data is scheduled to be auto-republished and gives the user the chance to disable the auto-republishing feature. A user may also input a command similar to "do not show this message again," which enables the auto-republishing feature and causes the message not to be shown again in the future.

A publish object 204 may further include an "alert string," which is the text corresponding to an alert that may be displayed during the auto-republication process. As mentioned, auto-republication of native data 202 into a published file 230 may result in one or more alerts being displayed to the user. An alert may be in the form of a warning message indicating, for example, that certain formatting or data will be lost during republication. Alternatively, an alert may be in the form of an error message indicating that the republication operation cannot be successfully competed. A publish object 204 may correspond to a plurality of data elements, which may give rise to many alerts during auto-republication. However, rather than display every alert to the user, the present invention determines which alert is most critical and displays only that alert to the user. Accordingly, all alerts that may possibly be generated during the republication of the selected native data 202a are identified and are ranked based on some predefined criteria. The most critical alert is then inserted into the alert string 212 of the publish object 204. Thus, while a publication operation may involve many publish objects, only one alert per publish object is displayed to the user. The alert displayed to the user may include an interface for inputting a command similar to "do not show this message again while this workbook is open." This command will cause the alert to be suppressed for the duration of the current session.

Microsoft's EXCEL 2000 is an example of an electronic spreadsheet application program that includes functionality for publishing native data 202 into a published file 161, e.g. an HTML file. Such functionality is described and claimed in United States Patent Application entitled "Publishing/Republishing Data Tables In HTML Documents," which was filed on Jun. 15, 1999 and assigned Ser. No. 09/333,816, and which is hereby incorporated by reference in its entirety. Generally, a preferred process for publishing selected native data 202a into a published file 161 involves the creation of a unique identifier 206 that identifies both the publish object 204 in the publish object list 162 and the published data 230 in the published file 161. After the unique identifier 206 is created, the user is prompted to specify the location of the destination published file 161. The destination published file 161 may be stored locally, or at a remote location. Also, the destination published file 161 may be an existing file or may be created as a result of the publishing operation.

Once the destination published file 161 is created or retrieved, the selected native data 202a is translated into a compatible format (e.g. an HTML compatible format for a destination HTML file) and is written into the destination published file 161. A tag may be embedded in the published file 161 in order to identify the published data 230. The tag may emulate the unique identifier 206 that is associated with the publish object 204 in the publish object list 162. By way of example only, if the selected native data 202a is translated into an HTML format a "div id" HTML tag 222 may be created which includes the same unique identifier 206 as is associated with the publish object 204 in the publish object list 162. As is known in the art, the relevant formatting information associated with the selected native data 202a may be included in an HTML file by way of a style tag 220. In addition, the body of the HTML file may include information relative to using ActiveX control to enable interactive manipulation of the published data 230 via a browser application program 139. After the selected native data 202a is translated into an HTML format and is written into the destination HTML file, the destination HTML file is saved to its original or intended location, which may be a local or a remote memory location.

After initial publication of the selected native data 202a into the destination published file 161, the user may modify the selected native data 202a, or a portion thereof, within the native data file 160. If the selected native data 202a is modified in the native data file 160, it may be desirable to republish it into the destination HTML file 161. The present invention allows the selected native data 202a to be automatically republished, thereby eliminating the need for the user to generate additional user input commands for republishing the selected native data 202a every time the native data file 160 is subsequently modified. Through a single user interface displayed during the initial publication process, the user may be prompted to generate a single user input command to specify whether the selected native data 202a is to be automatically republished whenever the native data file 160 is resaved. In response to the single user input command, the auto-republish flag 211 may be set indicate whether the selected native data 202a is to be automatically republished. Those skilled in the art will appreciate that there are many methods for setting a flag or a similar property indicator. For example, the auto-republish flag may be set to "yes" or "no," "true" or "false," "1" or "0," etc.

In accordance with an exemplary embodiment of the present invention, the automatic republication of selected native data 202a may be facilitated by an auto-republish module 137. The auto-republish module 137 may be included within, or may otherwise be in communication with, a source application program 136. In an illustrative embodiment, the auto-republish program module 137 comprises a sub-routine or function that is called in response to execution of the "save" command in the source application program 136. Accordingly, the computer-executable instructions of the source application program 136 associated with the "save" command may be modified to include a call to the auto-republish program module 137. The auto-republish program module 137 is operable to scan the publish object list 162 to determine which publish object 204, if any, has a flag set to indicate that the corresponding native data 202 is to be republished. Functionality for republishing native data into an HTML document is also provided in EXCEL 2000, and is described and claimed in the prior patent application previously incorporated by reference. Generally, the republication process involves retrieving the published file 161 and replacing the previously published data therein with the modified published data or "republished data."

Figure 3:
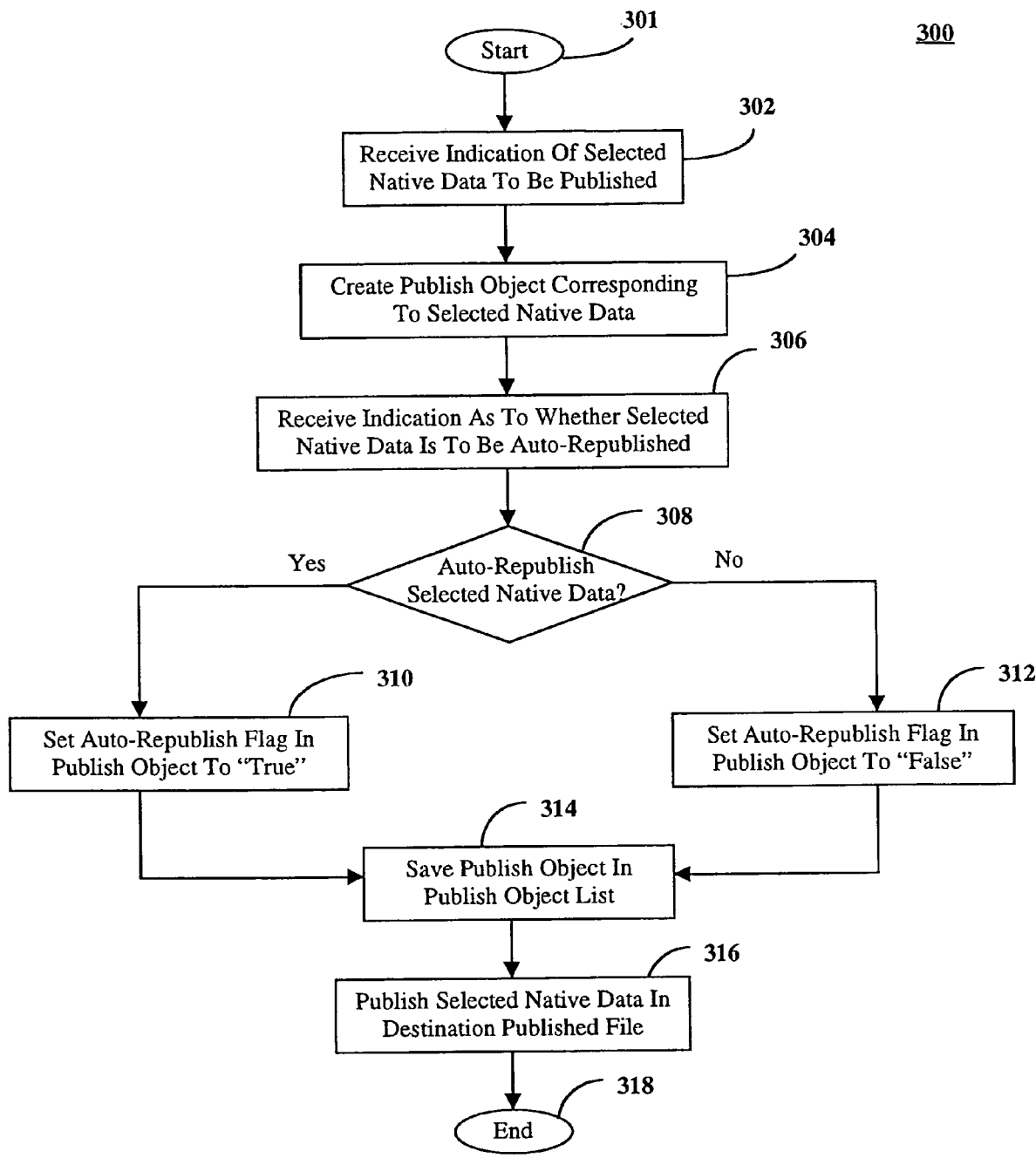
FIG. 3 is a flow chart illustrating an exemplary method for creating a data structure corresponding to published data that may optionally be flagged for automatic republication.

FIG. 3 is a flow chart that generally illustrates the steps involved in an initial publication process in accordance with an exemplary embodiment of the present invention. The exemplary method 300 begins at starting block 301 and proceeds to step 302, where an indication is received that selected native data 202a is to be published into an published file 161. Next at step 304, a publish object 204 is created corresponding to the selected native data 202a. As previously mentioned, a publish object 204 is a data structure that records various properties of the selected native data 202a and the corresponding published data 230. At step 306, an indication is received indicating whether the selected native data 202a is to be automatically republished. The indication at step 306 may be a user input command generated by a user of the source application program 136, in response to a user interface prompt. For example, a selectable control element, such as a checkbox, button or other icon, may be presented to the user along with a query regarding publication. The selectable control element may be activated in the event that the user desires the selected native data 202a to be automatically republished.

If the indication at step 306 indicates that the user desires the selected native data 202a to be automatically republished, the method advances to step 310, where the auto-republish flag 211 in the publish object 204 is set to "true," or an equivalent value thereof. However, if the indication at step 306 indicates that the user does not desire the selected native data 202a to be automatically republished, the method proceeds to step 312, where the auto-republish flag 211 in the publish object 204 is set to "false," or an equivalent value thereof. After the auto-republish flag 211 in the publish object 204 is set in step 310 or step 312, the method moves to step 314, where the publish object 204 is saved in a publish object list 162 data structure that is associated with the native data file 160 in which the native data 202a resides. After the publish object 204 is saved in the publish object list 162, the selected native data 202a is published into the appropriate destination published file 161. The exemplary method 300 ends at step 318.

Figure 4:
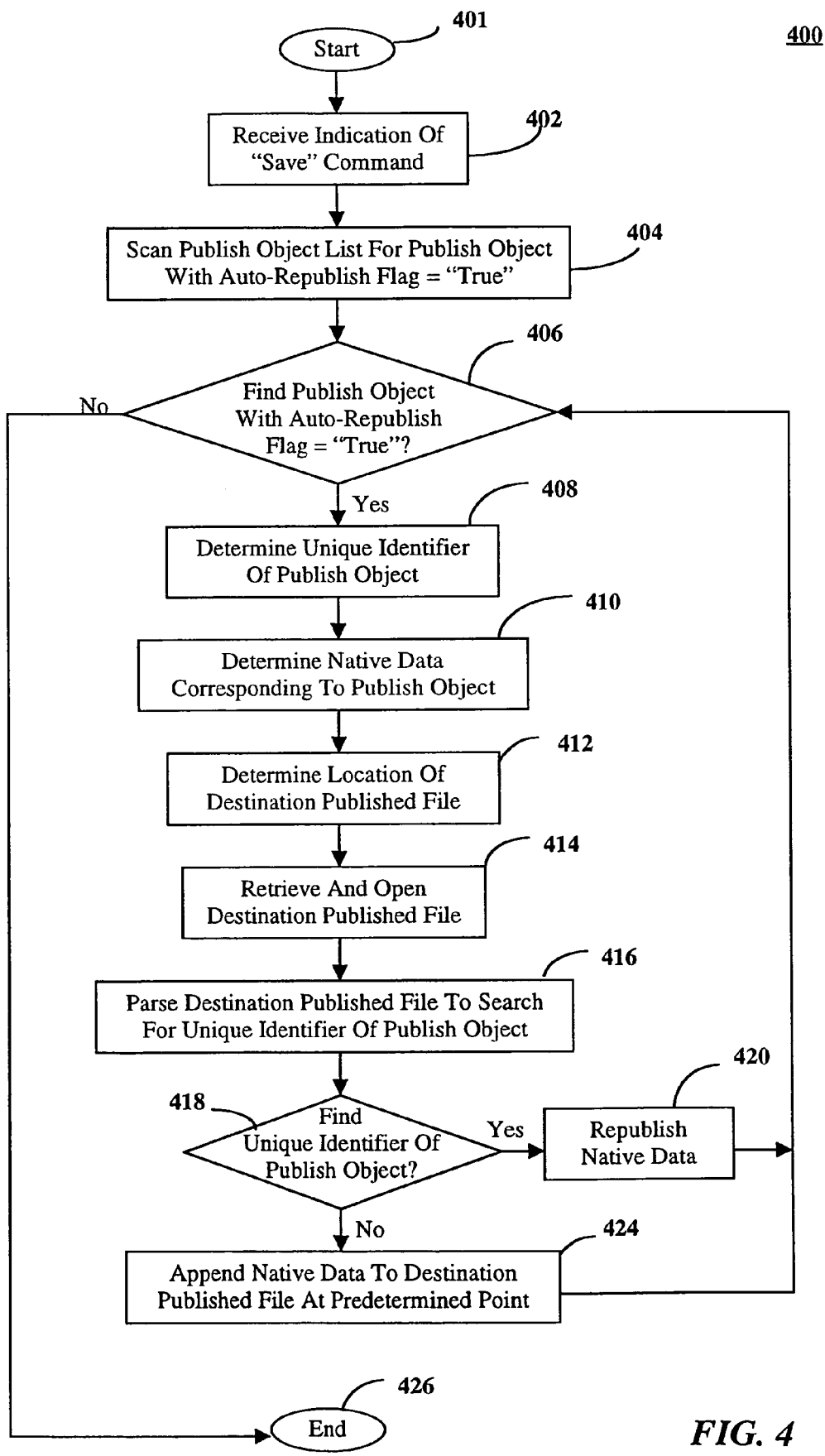
FIG. 4 is a flow chart illustrating an exemplary method for automatically republishing data into a published file.

FIG. 4 is a flowchart illustrating an exemplary republication method in accordance with an exemplary embodiment of the present invention. The exemplary method 400 begins at starting block 401, where a source application program is executed by a user to modify a native data file 160. At least a portion of the native data 202 in the native data file 160 has previously been published. Also, a publish object list has been created and associated with the native data file 160. The method next proceeds to step 402, where an indication is received that a "save" command has been generated by the user. The save command indicates that the user desires to save the modifications made to the native data 202. In response to the save command, the method moves to step 404, where the publish object list 162 is scanned for a publish object 204 having an auto-republish flag 211 set to "true."

If it is determined at decision block 406 that no publish object 204 having an auto-republish flag 211 set to "true" is found, the method ends at step 426. However, if it is determined at decision block 406 that a publish object 204 having an auto-republish flag 211 set to "true" is found, the method continues at step 408. At step 408, the unique identifier 206 of the publish object 204 is determined. Then, at step 410, the selected native data 202a referenced by the native data reference 207 of the publish object 204 is determined. At step 412, the location of the destination published file 161 is determined by way of the reference to the destination published file location 208 of the publish object 204.

The destination published file 161 is retrieved and opened at step 414. Then, at step 416, the destination published file 161 is parsed in order to search for the unique identifier 206 corresponding to the publish object 204 and the previously published data 230. As mentioned, the unique identifier 206 may be stored in the destination published file 161 as a tag, such as a "div id" tag 222. If the unique identifier 206 is found within the destination published file 161 at step 418, the selected native data 202a is republished at step 420 into the destination published file 161 at the location marked by the unique identifier 206.

The parsing and republication process may involve the creation of a temporary published file. As an example, HTML code from a destination HTML file may be sequentially copied into a temporary HTML file until the unique identifier 206 is located. When the unique identifier 206 is located, by way of a start "div id" tag, the modified native data to be republished may be copied into the temporary HTML file in sequence. An end "div id" tag may be used to signal the end of the republished data. When the republished data has been copied into the temporary HTML file, the remainder of the HTML code from the destination HTML file, except the previously published data 230, is appended in sequence to the temporary HTML file. When it is determined that the temporary HTML file is complete and valid, the destination HTML file 161 may be replaced by the temporary HTML and the temporary file may be renamed with the title 209 of the destination HTML file 161. Additional details regarding the republication process may be ascertained from the above-mentioned prior patent application, which has previously been incorporated by reference in its entirety.

If at step 418 the unique identifier 206 is not found within the destination published file 161, the selected native data 202a is appended to the end of the destination published file 161. The unique identifier 206 may not be found within the destination published file 161, for example, if the destination published file 161 has been modified subsequent to the last publish operation. After the selected native data 202a is republished at step 418 into the destination published file 161 at step 420 or step 424, the method returns to step 404 to scan the publish object list 162 for another publish object 204 having an auto-republish flag 211 set to "true." The method is then repeated until no other publish object 204 having an auto-republish flag 211 set to "true" is found at step 406. When no other publish object 204 having an auto-republish flag 211 set to "true" is found at step 406, the method ends at step 426.

Although the present invention has been described in connection with various exemplary embodiments, those of ordinary skill in the art will understand that many modifications can be made thereto within the scope of the claims that follow. For example, it has been described that auto-republication is performed each time a native data file is resaved, without regard to whether the resave operation was a "save as" operation. In an alternate embodiment, all auto-republish flags may be set to "false" when a "save as" command is detected, so that no auto-republication will occur. A "save as" command is typically used when a user desires save the native data to a new file, which may or may not be a private file. Thus, for security reasons, it may be presumed that the user does not want to auto-republish any native data during a "save as" operation, unless the user explicitly indicates otherwise. Other alternate embodiments will also occur to those of ordinary skill in the art. Accordingly, it is not intended that the scope of the invention in any way be limited by the above description, but instead be determined entirely by reference to the claims that follow.

What is claimed is:

1. A computer readable medium, stored on at least one tangible medium, and comprising computer executable instructions for automatically republishing a portion of native data from a native data file associated with an application program into published data within a published file, the computer executable instructions comprising:
   creating a publish object list, when initially publishing a portion of native data into a published file;
   creating a publish object, when initially publishing the portion of native data into the published file, the publish object identifying the portion of the native data being published and indicating whether the portion of the native data is to be automatically republished upon a resave of the native data file;
   incorporating the publish object into the publish object list;
   subsequent to initially publishing the portion of the native data, determining that the native data file has been resaved;
   in response to determining that the native data file has been resaved, determining from the publish object in the publish object list that the portion of the native data is to be automatically republished; and
   in response to determining that the portion of the native data is to be automatically republished, retrieving the published file and republishing the portion of the native data into the published file.

2. The computer readable medium of claim 1, wherein the publish object is identified by a unique identifier.

3. The computer readable medium of claim 1, wherein the publish object further indicates the location of the published file.

4. The computer readable medium of claim 1, wherein republishing the portion of the native data into the published file further comprises:
   upon a resave of the native data, locating the portion of the published data within the published file by way of a unique identifier;
   deleting the portion of the published data;
   locating the portion of the native data within the native data file by way of the publish object;
   translating the portion of the native data into a published file format; and
   replacing the portion of the published data with the translated portion of the native data.

5. The computer readable medium of claim 1, wherein the publish object further identifies an alert string associated with the portion of the native data, the alert string comprising a single alert to be displayed when the portion of the native data is republished.

6. The computer readable medium of claim 5, wherein the alert string is determined by identifying a plurality of alerts that should be displayed when the portion of the native data is republished, determining which of the plurality of alerts is most critical, and storing the most critical alert as the alert string.

7. A computer readable medium, stored on at least one tangible medium, comprising computer executable instructions for automatically republishing native data from a native data file into a published file, at least one native data element having previously been published into the published file and a publish object list having been associated with the native data file, the publish object list including at least one publish object indicating whether a selected native data element is to be automatically republished, identifying the location of the selected native data element in the native data file, and identifying the location of the published data element in the published file, the computer executable instructions comprising:
   subsequent to initially publishing the selected native data element, determining that the native data file has been resaved;
   in response to determining that the native data file has been resaved, stepping through each publish object in the publish object list;
   determining from the publish object that the selected native data element is to be automatically republished;
   in response to determining that the selected native data element is to be automatically republished, retrieving the published file and republishing the selected native data element into the published file;
   wherein the publish object is identified by a unique identifier;
   wherein the published data element within the published file is identified by the unique identifier;
   wherein the publish object further indicates a reference to the location of the selected native data element within the native data file; and
   wherein republishing the selected native data element into the published file further comprises:
   locating the published data element within the published file by way of the unique identifier;
   deleting the published data element;
   locating the native data element within the native data file by way of the publish object;
   translating the native data element into a published file format; and
   replacing the published data element with the translated native data element.

8. The computer readable medium of claim 7, wherein the publish object further indicates the location of the published file; and wherein retrieving the published file further comprises:
determining the location of the published file by way of the publish object; and
retrieving the published file from the location.

9. The computer readable medium of claim 7, wherein the publish object further identifies an alert string associated with the selected native data element, the alert string comprising a single alert to be displayed when the selected native data element is republished.

10. A computer readable medium, stored on at least one tangible medium, comprising computer executable instructions for automatically republishing a portion of native data from a native data file associated with an application program into published data within a published file, the computer executable instructions comprising:
creating a publish object list, when initially publishing a portion of native data into a published file;
creating a publish object for each portion of native data published, wherein the publish object is a data structure with a plurality of data elements comprising a unique identifier, an identification of the portion of native data being published, a location of the portion of native data within the native data file, an identification of the published file where the portion of native data was initially published, a location of the published file, and a designation of whether the portion of native data is to be automatically republished upon a resave of the native data file;
incorporating the publish object into the publish object list;
subsequent to initially publishing the portion of the native data, determining that the native data file has been resaved;
in response to determining that the native data file has been resaved, determining from the publish object in the publish object list that the portion of the native data is to be automatically republished; and
in response to determining that the portion of the native data is to be automatically republished, retrieving the published file and republishing the portion of the native data into the published file.

11. The computer readable medium of claim 10, wherein the published data within the published file is identified by the unique identifier; and
wherein republishing each portion of native data corresponding to a publish object indicating that the native data element is to be automatically republished into the published file further comprises:
translating each modified portion of native data into a published file format;
locating the published data corresponding within the published file by way of the unique identifier; and
replacing the published data corresponding with the translated portion of native data.

12. The computer readable medium of claim 10, wherein retrieving the published file further comprises:
determining the location of the published file by way of the publish object; and
retrieving the published file from the location.

13. The computer readable medium of claim 10, wherein republishing each portion of native data corresponding to a publish object indicating that the portion of native data is to be automatically republished into the published file further comprises:
locating the published data within the published file by way of the unique identifier,
deleting the published data,
locating the portion of native data corresponding within the native data file by way of the publish object,
translating the portion of native data corresponding into a published file format, and
replacing the published data with the translated portion of native data.

14. The computer readable medium of claim 10, further comprising a display device; and
wherein the publish object further identifies an alert string associated with the native data element corresponding, the alert string comprising a single alert to be displayed on the display device when the native data element corresponding is republished.

15. The computer readable medium of claim 10, wherein the alert string is determined by identifying a plurality of alerts that should be displayed when the native data element corresponding is republished, determining which of the plurality of alerts is most critical, and storing the most critical alert as the alert string.

* * * * *